US008591306B1

(12) United States Patent
Kearns

(10) Patent No.: US 8,591,306 B1
(45) Date of Patent: Nov. 26, 2013

(54) METHOD AND SYSTEM FOR AN ON-LINE CARD GAME

(71) Applicant: Lloyd L. Kearns, Elk Grove, CA (US)

(72) Inventor: Lloyd L. Kearns, Elk Grove, CA (US)

( * ) Notice: Subject to any disclaimer, the term of this patent is extended or adjusted under 35 U.S.C. 154(b) by 0 days.

(21) Appl. No.: 13/627,891

(22) Filed: Sep. 26, 2012

(51) Int. Cl.
*G06F 17/00* (2006.01)

(52) U.S. Cl.
USPC .......... 463/13

(58) Field of Classification Search
USPC .......... 463/11–13, 16, 20; 273/292, 293
See application file for complete search history.

(56) References Cited

U.S. PATENT DOCUMENTS

| | | | | |
|---|---|---|---|---|
| 5,762,340 | A | 6/1998 | Feola | |
| 6,478,675 | B1 | 11/2002 | Awada | |
| 7,017,909 | B1 | 3/2006 | Awada | |
| 7,527,268 | B2 | 5/2009 | Scapaticci | |
| 7,758,411 | B2 * | 7/2010 | Crawford, III et al. | 463/13 |
| 7,794,324 | B2 * | 9/2010 | White et al. | 463/29 |
| 2001/0040344 | A1 | 11/2001 | Zahedi | |
| 2003/0107174 | A1 | 6/2003 | Loewenstein | |
| 2004/0262844 | A1 | 12/2004 | Manzo et al. | |
| 2005/0023760 | A1 | 2/2005 | Chen et al. | |
| 2006/0046815 | A1 | 3/2006 | Shinoda | |
| 2006/0068899 | A1 * | 3/2006 | White et al. | 463/25 |
| 2006/0189365 | A1 * | 8/2006 | Crawford et al. | 463/13 |
| 2007/0021172 | A1 | 1/2007 | Black | |
| 2008/0012222 | A1 | 1/2008 | Starzec | |
| 2008/0076501 | A1 * | 3/2008 | Mares et al. | 463/13 |
| 2009/0082079 | A1 * | 3/2009 | Kuhn et al. | 463/13 |
| 2009/0124314 | A1 * | 5/2009 | Halligan et al. | 463/13 |
| 2010/0311494 | A1 * | 12/2010 | Miller et al. | 463/22 |
| 2011/0260401 | A1 | 10/2011 | Eller | |

* cited by examiner

*Primary Examiner* — Ronald Laneau
(74) *Attorney, Agent, or Firm* — Ariel S. Bentolila; Bay Area IP Group, LLC

(57) ABSTRACT

A method and system comprise accessing a server unit configured for conducting an on-line card game comprising a plurality of players engaging in wagering on an outcome. A plurality of other players is joined in play of an on-line card game. At least two values for hole cards are received from the server unit for display with a representation of a gaming table. The values are hidden from the other players at least during rounds of the play. The sever unit is requested to exchange a selected one of the values for another randomly generated value during a round of the play. The requesting is hidden from the other players. The randomly generated value is received from the server unit in exchange for the selected value. The randomly generated value is hidden from the other players at least during rounds of the play.

18 Claims, 7 Drawing Sheets

METHOD AND SYSTEM FOR AN ON-LINE CARD GAME

CROSS-REFERENCE TO RELATED APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to gaming systems. More particularly, one or more embodiments of the invention relate to gaming systems with card exchange.

BACKGROUND OF THE INVENTION

Online gaming systems provide capability for a multiplicity of players to play games such as poker, stud poker, five-card draw, etc.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1A:
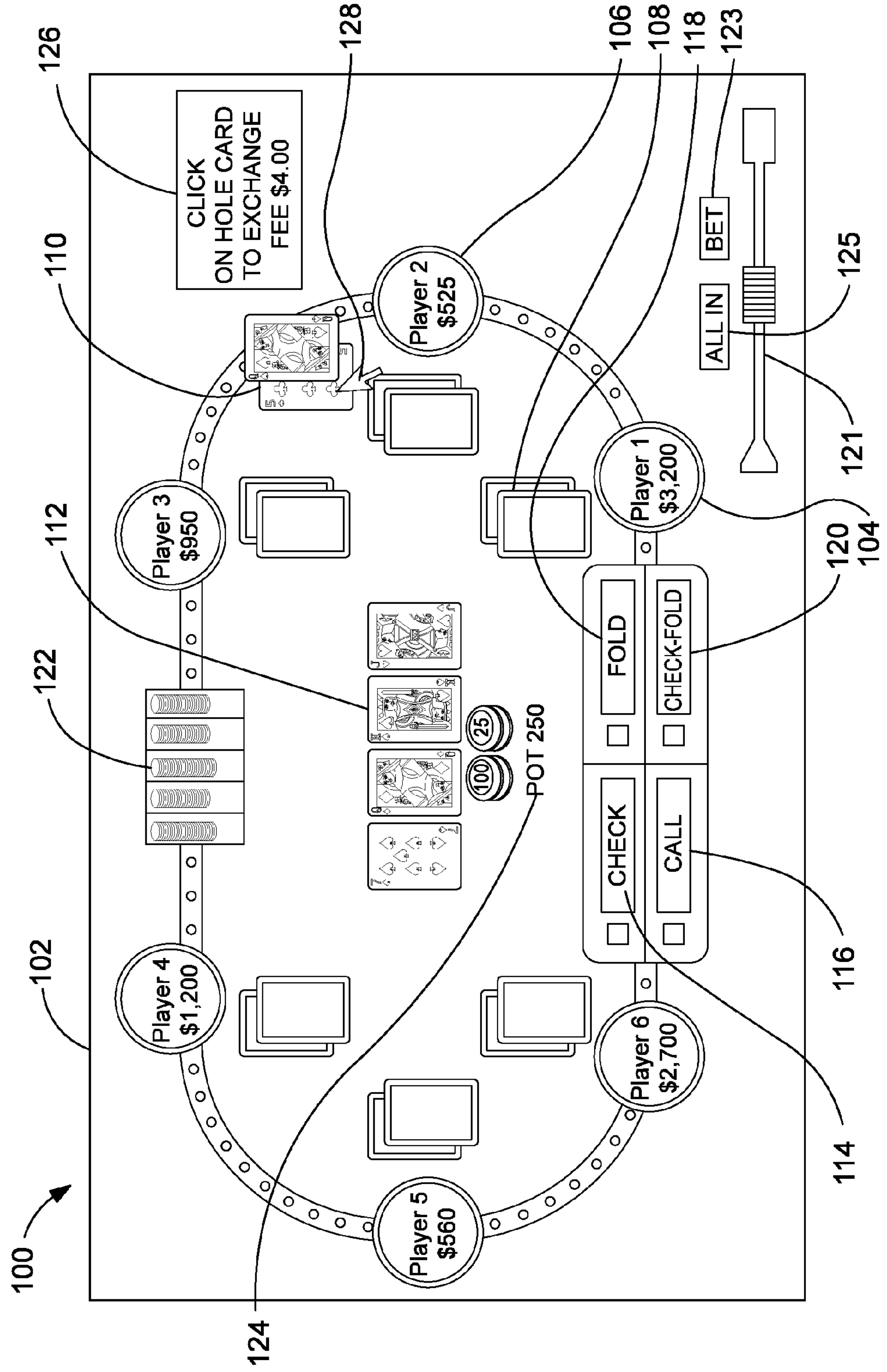
FIG. 1A illustrates an example presentation, in accordance with an embodiment of the present invention.

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms “a,” “an,” and “the” include the plural reference unless the context clearly dictates otherwise. Thus, for example, a reference to “an element” is a reference to one or more elements and includes equivalents thereof known to those skilled in the art. Similarly, for another example, a reference to “a step” or “a means” is a reference to one or more steps or means and may include sub-steps and subservient means. All conjunctions used are to be understood in the most inclusive sense possible. Thus, the word “or” should be understood as having the definition of a logical “or” rather than that of a logical “exclusive or” unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a microcomputer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as “processing,” “computing,” “calculating,” “determining,” or the like, refer to the action and/or processes of a computer or computing system, or similar electronic computing device, that manipulate and/or transform data represented as physical, such as electronic, quantities within the computing system’s registers and/or memories into other data similarly represented as physical quantities within the computing system’s memories, registers or other such information storage, transmission or display devices.

In a similar manner, the term “processor” may refer to any device or portion of a device that processes electronic data from registers and/or memory to transform that electronic data into other electronic data that may be stored in registers and/or memory. A “computing platform” may comprise one or more processors.

A non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; however, the non-transitory computer readable medium does not include a pure transitory signal per se.

Systems will be described with provides means and methods for providing an online game. Furthermore, the game accommodates a multiplicity of players. Furthermore, the game provides players with the capability for exchanging a hole card for a new card without other players being made aware of the occurrence of the exchange. Furthermore, information associated with fees for performing the exchange(s) is/are presented at the end of the game such that the occurrence of the exchange(s) remains anonymous to the other players. Selection of a hole card for exchange enables illumination of the card such that a player is made aware of the hole card chosen for exchange. Discard and cancel selections are provided for continuing an exchange or terminating an exchange. Discard and cancel selections may be illuminated or highlighted prior to selection when hovered over with a cursor.

FIG. 1A illustrates an example presentation, in accordance with an embodiment of the present invention.

A presentation 100 includes a presentation area 102, a multiplicity of player indicators with a sampling noted as a player indicator 104, a player indicator 106, a multiplicity of playing card indicators with a sampling noted as a playing card indicator 108 and a playing card indicator 110, a community playing card indicator 112, a check selection 114, a call selection 116, a fold selection 118, a check-fold selection 120, a bet/raise selection 121, a bet activation selection 123, a all-in selection 125, a chips indicator 122, a pot indicator 124, a card exchange/fee indicator 126 and a selection pointer 128.

Presentation area 102 presents information associated with the game to a player. Player indicator 104 and player indicator 106 provide information associated with players. Non-limiting examples of information provided by player indicator 104 and player indicator 106 include name and amount available to player for placing a bet (e.g. money in the bank). Playing card indicator 108 represents the “hole” cards dealt to a player. Furthermore, playing card indicator 108 is viewable to the player associated with playing card indicator 108, but not viewable to other players. For this example, the playing cards are not viewable to the player viewing presentation area 102. Playing card indicator 110 represents the “hole” cards dealt to a player. Furthermore, playing card indicator 110 is viewable to the player associated with playing card indicator 110, but not viewable to other players. For this non-limiting example, the playing cards presented by playing card indicator 110 are the five of clubs and the queen of spades. Community playing card indicator 112 represents information associated with community playing cards which have been dealt. For this non-limiting example, the playing cards presented for community playing card indicator 112 are the seven of spades, the queen of diamond, the king of spades and the jack of hearts. Check selection 114 enables a player to select to “check” indicating the player selects to not make a bet. Call selection 116 enables a player to select to “call” indicating the player selects to match the previous bet. Fold selection 118 enables a player to select to “fold” indicating the player selects to withdraw from the round of play. Check-fold selection 120 enables a player to select to check if possible, and fold if check is not possible. Bet selection 121 enables a player to raise the amount of the previous bet. Bet activator selection 123 enables a player to place their selected new bet. All-In selection 125 enables a player to bet all of his/her remaining chips. Chip tray indicator 122 is nonfunctional and for decoration value only. Pot indicator 124 represents the amount of money placed in the pot by the various players through betting, calling and raising. The players are attempting to win the money placed in the pot. Exchange indicator 126 presents information for which a player may exchange a hole card as represented by playing card indicator (e.g. playing card indicator 110) for a new card. As a non-limiting example, the five of clubs associated with playing card indicator 110 may be replaced by a new card. Selection pointer 128 enables selection of choices with regard to operation of game.

For this example, the information presented via presentation area 102 is viewable by the player associated with player indicator 106.

The information presented via presentation area 102 represents an online Internet game in progress. As a non-limiting example, the game “Texas Twist’em” is a variation of the “Texas hold’em” poker game. As a non-limiting example, the game may be played with a standard deck of playing cards minus the jokers, with no limit and with $2/$1 blinds. As a non-limiting example, the small blind (e.g. $1) is posted by the player to the left of the dealer and is usually equal to half of the big blind (e.g. $2). The big blind, posted by the player to the left of the small blind, is equal to the minimum bet. As a non-limiting example, six players may play the game with the various players interacting with the game via a computing device (e.g. personal computer, tablet, laptop, smartphone, etc.). As a non-limiting example, a random number generator may be used for generating a random selection of playing cards. As illustrated in FIG. 1, the players have been dealt two cards with the two cards noted "hold cards". The players receive the two hold cards (e.g. playing card indicator 108 and playing card indicator 110) at the start of play. A player can view the contents of his own card, but may not view the contents of other player's cards. Players can view the information associated with the other players. Non-limiting examples of information presented for the other players include name and amount of money in the bank. As a non-limiting example, the game is played with four betting rounds beginning with the "Hole" cards round also noted as the "pre-flop". The "Hole" card round is followed by the "Flop" round. The "Flop" round is followed by the "Turn" round. The "Turn" round is followed by the "River" round. Three playing cards are randomly dealt face up on the "Flop" round, one card is dealt face up on the "Turn" round and one card is dealt face up on the "River" round. The five cards dealt face up during the "Flop", "Turn" and "River" rounds are noted as the community cards (e.g. community playing card indicator 112). Players use the five community cards along with their two hold cards to form the best possible five card poker hand. As illustrated in FIG. 1, the game has progressed to the third betting phase or the "Turn" round. As illustrated by community playing card indicator 112, the "Flop" cards are represented by the seven of spade, the queen of diamond and the king of space with the "Turn" card represented by the jack of heart. For FIG. 1, the final card or the "River" card has not yet been dealt.

Players are given the option of exchanging a weak hole card for another card from the game deck. Players are allowed to use the exchange option only once during play of the game and can perform the exchange during any of the four betting rounds, but prior to making a bet for the round. The other players are not made aware of a player's decision to perform an exchange. The software associated with the game blocks the other players from viewing another player performing the exchange.

The turn has transitioned to the player represented by player indicator 106. Exchange indicator 126 is presented to the player associated with player indicator 106 informing the player of the option to exchange a hole card. Exchange indicator 126 is only visible to the player the game action is on. Exchange indicator 126 also presents information informing the player of the fee that is to be debited from his account for performing the exchange. As a non-limiting example, a "Hole" round exchange may be performed for the price of a big blind or $2, a "Flop" round exchange may be performed for the price of the big blind plus one small blind (e.g. $2+$1=$3), a "Turn" round exchange may be performed for the price of the big bind plus two small blinds (e.g. $2+$2=$4) and a "River" round exchange may be performed for the price of the big blind plus three small blinds ($2+$3=$5). As a non-limiting example, the exchange fee may vary depending upon the blinds and the betting structure of the various embodiments. As a non-limiting example, the fees may be configured as nominal in order to give players an opportunity to improve their hands and remain in the game instead of folding early in the game. As a non-limiting example, the opportunity to improve a hand increases with a new betting round and the card fee may be configured to increase with a new betting round. Fees associated with performing the exchange are contributed to the main pot, however, presentation of the contribution is presented at the end of the game in order to prevent other players from being made aware of another player's performing an exchange. Exchange indicator 126 appears to a player during the various rounds until a player has performed an exchange, after which exchange indicator 126 is not presented to the player. A player may choose to ignore the opportunity for performing an exchange and retain the hole cards dealt at the beginning of the game.

As a non-limiting example, selection pointer 128 provides the player associated with player indicator 106 the capability to select to exchange an initial hole card for a new card. As a non-limiting example, exchanging an initial hole card for a replacement card is performed in order to replace a weak card with a better card in an attempt to improve a player's hand. A player selecting the hole card to replace initiates the process of exchanging a hole card for a new card. As a non-limiting example, selecting the five of clubs initiates a card exchange with the five of club card illuminating which presents the player with the card chosen to be exchanged. Additionally, exchange indicator 126 is replaced with a "DISCARD" selection and a "CANCEL" selection as will be described further with reference to FIG. 1B below.

FIG. 1A illustrates an example presentation for an online Internet game, where a player may select to exchange a hole card with a new card while the other players remain unaware of the occurrence of the exchange.

Figure 1B:
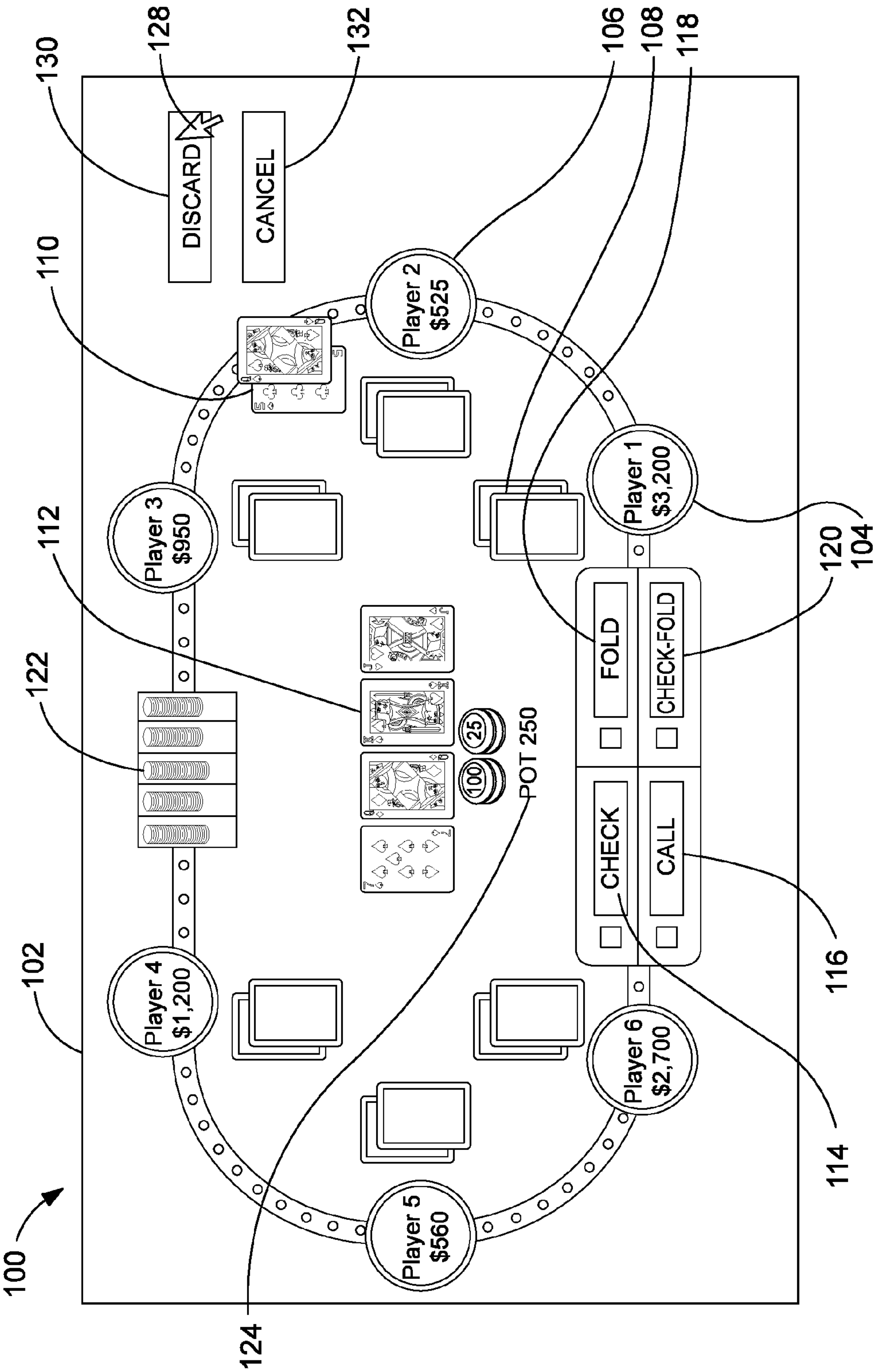
FIG. 1B further illustrates the example presentation as described with reference to FIG. 1A, in accordance with an embodiment of the present invention.

FIG. 1B further illustrates the example presentation as described with reference to FIG. 1A, in accordance with an embodiment of the present invention.

Presentation 100 includes some elements as described with reference to FIG. 1A in addition to a discard selection 130 and a cancel selection 132.

Discard selection 130 enables continued exchange of an initial hole card with a new card. Cancel selection 132 enables discontinuation of the process for exchanging an initial hole card with a new card. Discard selection 130 may be highlighted or illuminated when a cursor hovers over discard selection 130. Cancel selection 132 may be highlighted or illuminated when a cursor hovers over cancel selection 132.

After selecting to exchange an initial hole card with a new card, the associated player is presented with discard selection 130 and cancel selection 132. When a player moves selection pointer 128 over discard selection 130 or cancel selection 132, the respective selection illuminates. The player can select discard selection 130 to complete the card exchange. As a non-limiting example, the five of club card is replaced with a new card from the remaining deck stub. Following selection of discard selection 130 or cancel selection 132, the respective selections disappear. The player also has the option of selecting cancel selection 132 after which the operation for the card exchange is terminated and the player continues playing the game. This option is not available once the discard and exchange is completed.

FIG. 1B further illustrates the example presentation as described with reference to FIG. 1A where a player has the option of selecting to continue exchanging an initial hole card for a replacement card or terminating the card exchange process.

Figure 1C:
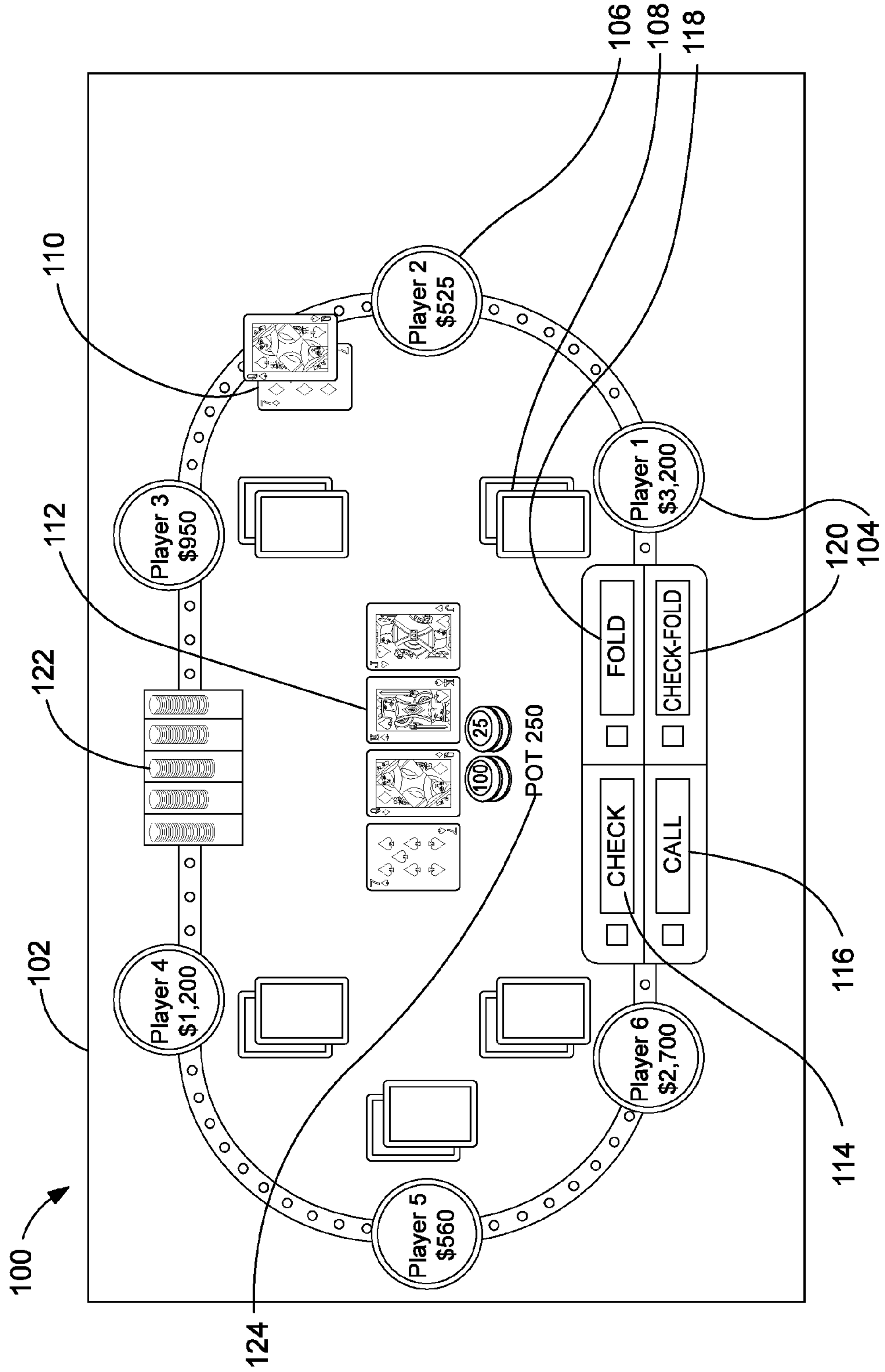
FIG. 1C further illustrates the example presentation as described with reference to FIGS. 1A-B, in accordance with an embodiment of the present invention.

FIG. 1C further illustrates the example presentation as described with reference to FIGS. 1A-B, in accordance with an embodiment of the present invention.

After selecting discard selection 130 as described with reference to FIG. 1B, the five of clubs associated with playing card indicator 110 has been replaced with a 7 of diamond. As a non-limiting example, the decision to exchange the initial hole card has provided the player with a stronger hand. As a non-limiting example, a result of performing the exchange and strengthening the hand enables the player to remain in the game instead of folding in an earlier round.

FIG. 1C further illustrates the example presentation as described with reference to FIGS. 1A-B where an initial hold card has been replaced with a new card.

Figure 2:
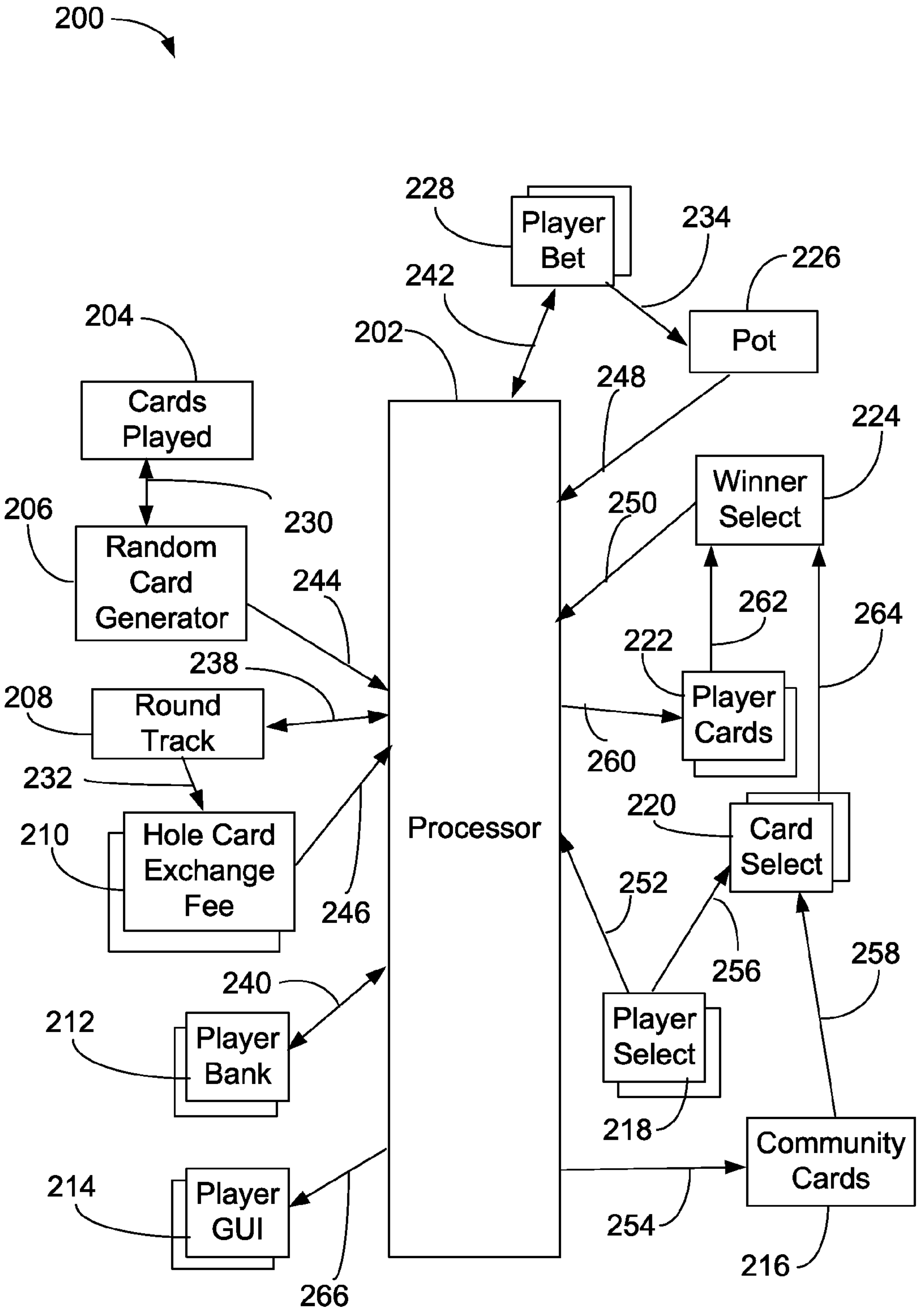
FIG. 2 illustrates an alternative embodiment of the example system, in accordance with an embodiment of the present invention.

FIG. 2 illustrates an alternative embodiment of the example system, in accordance with an embodiment of the present invention.

A system 200 includes a processor portion 202, a cards played portion 204, a random card generator portion 206, a round track portion 208, a multiplicity of hold card exchange fee portions with a sampling noted as a hole card exchange fee portion 210, a multiplicity of player banks with a sampling noted as a player bank portion 212, a multiplicity of player Graphical User Interfaces (GUI) with a sampling noted as a GUI portion 214, a community cards portion 216, a multiplicity of player selects with a sampling noted as a player select portion 218, a multiplicity of card selects with a sampling noted as a card select portion 220, a multiplicity of play cards with a sampling noted as a player cards portion 222, a winner select portion 224, a pot portion 226 and a multiplicity of player bets with a sampling noted as a player bet portion 228.

Random card generator portion 206 communicates bi-directionally with cards played portion 204 via a communication channel 230. Hole card exchange fee portion 210 receives information from round track portion 208 via a communication channel 232. Pot portion 226 receives information from player bet portion 228 via a communication channel 234. Processor portion 202 communicates bi-directionally with round track portion 208 via a communication channel 238, with player bank portion 212 via a communication channel 240 and with player bet portion 228 via a communication channel 242. Processor portion 202 receives information from random card generator portion 206 via a communication channel 244, from hole card exchange fee portion 210 via a communication channel 246, from pot portion 226 via a communication channel 248, from winner select portion 224 via a communication channel 250 and from player select portion 218 via a communication channel 252. Community cards portion 216 receives information from processor portion 202 via a communication channel 254. Card select portion 220 receives information from player select portion 218 via a communication channel 256 and from community cards portion 216 via a communication channel 258. Player cards portion 222 receives information from processor portion 202 via a communication channel 260. Winner select portion 224 receives information from player cards portion 222 via a communication channel 262 and from card select portion 220 via a communication channel 264. Player GUI portion 214 receives information from processor portion 202 via a communication channel 266.

System 200 performs processing associated with an online Internet game. Processor portion 202 performs processing associated with the operation of system 200. Cards played portion 204 performs operations associated with cards which have been previously been played. Random card generator portion 206 generates a random card from the subset of cards which have not been played. Round track portion 208 performs operations associated with tracking which round the game is currently engaged. Non-limiting examples of rounds tracked include “Hole”, “Flop”, “Turn” and “River”. Hole card exchange fee portion 210 performs operations associated with determining the fee for a player associated with performing a card exchanged based upon the current round. Player bank portion 212 performs operations associated with a player’s bank account. As a non-limiting example, player bank portion 212 may determine the amount money associated with a player’s account. Player GUI portion 214 presents information for viewing by a player. Community cards portion 216 performs operations associated with community cards. The contents associated with community cards are viewable by the various players. Player select portion 218 receives information from a player. Non-limiting examples of information received from a player include bet, all in, check, call, fold, check-fold, discard and cancel. Card select portion 220 performs processing associated with which community cards are selected for a player’s hand. In some embodiments, the player may determine which community cards are used and in some embodiments, card select portion 220 determines which cards are to be used for a player’s hand. Player cards portion 222 performs operations associated with a players hole cards. Winner select portion 224 determines the winning hand from the various players’ hands. In some embodiments, winner select portion 224 may determine a ranking for the various players’ hands. Pot portion 226 performs operations associated with the pot for a game. The pot may represent the amount of money associated with the various players’ bets. Player bet portion 228 performs operations associated with a players’ bets.

The game supports live play of the game with players using computing devices for interfacing with the game. The game may be played with a standard 52 deck of cards minus the jokers. As a non-limiting example, 15 players may play the game at a single table. The game may be played in “no limit”, “limit”, “pot limit” and tournament. In some embodiments, the hole card exchange may be performed for “draw” or “stud” poker games or other similar games.

The game provides a market or “dealer button” for indicating the current game dealer. The button transitions clockwise around the playing table with a new game. Before the game starts, the player clockwise and to the left of the button posts a forced bet called the “small blind”. The player seated clockwise and to the left of the small blind posted the “big blind”, which may be twice the “small blind”. Blinds may vary depending on the game stakes. The players are dealt 2 cards noted as “hole cards”. The players may view their own hole cards, but other player’s hole cards are not viewable and are viewed as face down. The game begins with the player to the left of the big blind. As a non-limiting example, players may “bet”, “call”, “raise” or “fold”. The action associated with the game proceeds clockwise around the table.

In operation, processor portion 202 retrieves round information from round track portion 208 and based upon the round retrieves cards from random card generator portion 206. Random card generator portion 206 communicates randomly selected cards to cards played portion 204 and retrieves the cards already played from cards played portion 204. Random card generator portion 206 does not select a card associated with cards played portion 204. Processor portion 202 communicates cards to player cards portion 222 and to community cards portion 216. Player may view associated game information via player GUI portion 214. Player may perform selections via player select portion 218. Player may view a notice for exchanging a hole card (e.g. exchange indicator 126 as shown in FIG. 1A) and may select to exchange a hold card for a new card. If player selects to exchange a hold card, the player is presented with the opportunity to continue the exchange (e.g. select discard selection 130 as shown in FIG. 1B) and is presented with the opportunity to discontinue the exchange (e.g. select cancel selection 132 as shown in FIG. 1B). If the player selects to discontinue the exchange, then play resumes as normal. If the player selects to continue the exchange, then player select portion 218 communicates the exchange selection to processor portion 202. Furthermore, processor portion 202 requests a new card from random card generator portion 206. Furthermore, random card generator portion 206 generates a random card for cards not included in the subset of cards associated with cards played portion 204. Furthermore, processor portion 202 receives the new card from random card generator portion 206. Furthermore, processor portion 202 communicates the new card to player cards portion 222. Player cards portion 222 receives the new card and replaces the old card with the new card. Player is presented with new card via player GUI portion 214. Player may perform a bet with the bet processed via player bet portion 228. Pot portion 226 receives updated bet information from player bet portion 228. Player bank portion 212 is processed based upon bet placed. After rounds associated with game have been processed, winner select portion 224 determines the winner. Processor portion 202 receives winner information from winner select portion 224 and updates player bank portion 212. Player bank portion 212 is further updated based upon card exchanges performed during the game as noted by hole card exchange fee portion 210. Players are notified of winner/losers, exchange fees and bank account updates via player GUI portion 214.

FIG. 2 illustrates an example system where random cards are generated from the set of cards not already played, round tracking is performed, hole card exchange fee processing is performed, player bank account processing is performed, players are presented information via GUIs, community cards are selected and presented, player selections are received and processed, card selection from set of community cards is performed, player hole card processing is performed, player bet processing is performed, pot processing is performed and winner selection is performed.

Figure 3:
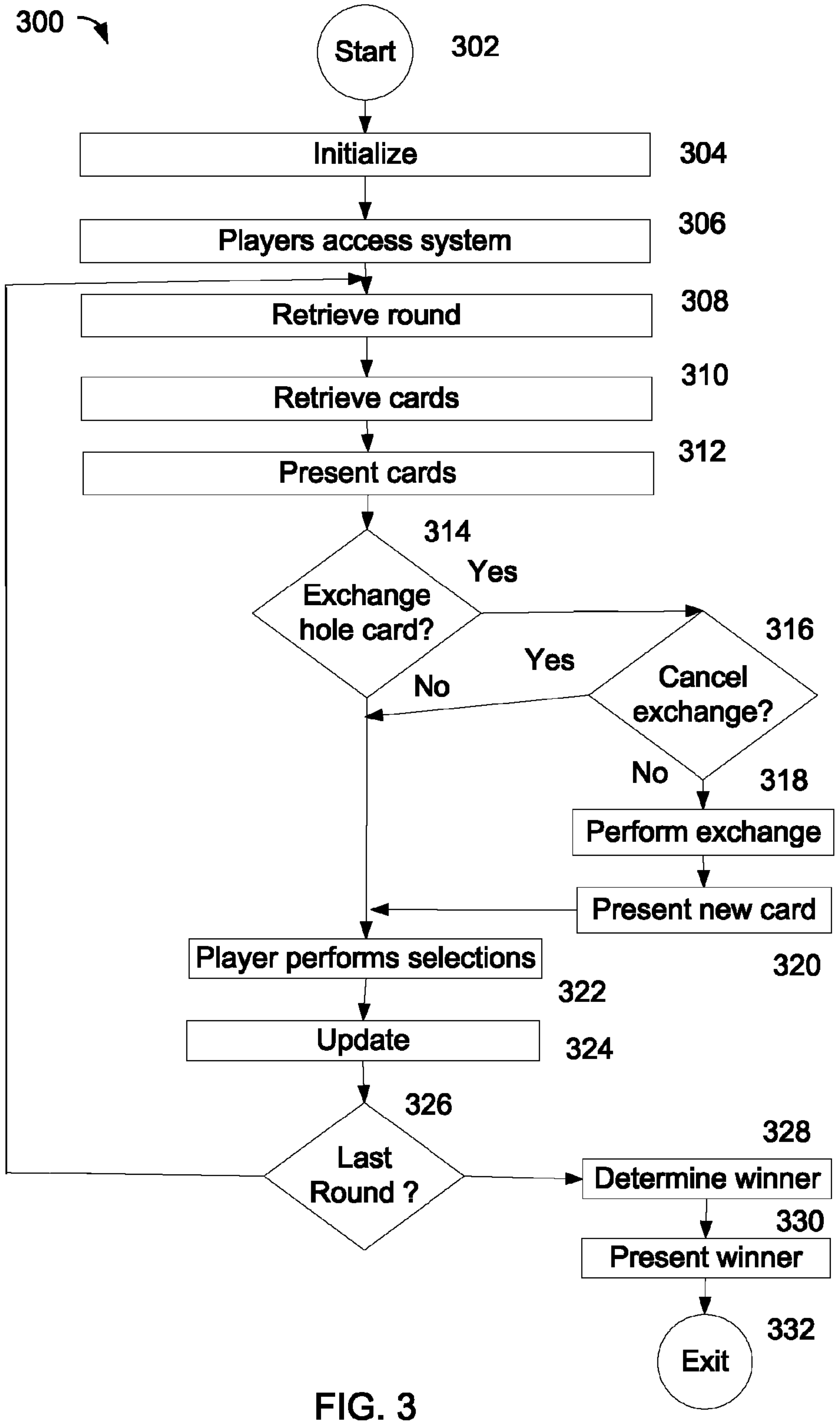
FIG. 3 illustrates an example method for operation of the system as described with reference to FIGS. 1-2, in accordance with an embodiment of the present invention.

FIG. 3 illustrates an example method for operation of the system as described with reference to FIGS. 1-2, in accordance with an embodiment of the present invention.

FIG. 3 presents a method 300 with a process initiating in a step 302.

In a step 304, system performs initialization operations.

As a non-limiting example, processor portion 202 (as shown in FIG. 2) may initialize round associated with round track portion 208 (as shown in FIG. 2), seed associated with random card generator portion 206 (as shown in FIG. 2) and configured cards played for cards played portion 204 (as shown in FIG. 2) to zero.

Referring back to FIG. 3, then in a step 306, players access system.

As a non-limiting example, a player may enter information needed for accessing system via player GUI portion 214 (as shown in FIG. 2). Furthermore, player may initialize amount of money associated with player bank portion 212 (as shown in FIG. 2).

Referring back to FIG. 3, then in a step 308, round information is retrieved.

As a non-limiting example, processor retrieves round information from round track portion 208 (as shown in FIG. 2). Non-limiting examples for round information include "Hole", "Flop", "Turn" and "River".

Referring back to FIG. 3, then in a step 310 playing cards are retrieved.

As a non-limiting example, for the "Hole" round, two hole cards are retrieved for the various players from random card generator portion 206 (as shown in FIG. 2). Furthermore, for the "Flop" round, three community cards are retrieved. Furthermore, for the "Turn" round, one community card is retrieved. Furthermore, for the "River" round one community card is retrieved. Furthermore, processor may communicate hole card information to player cards portion 222 (as shown in FIG. 2). Furthermore, processor may communicate community cards to community cards portion 216. Furthermore, cards generated by random card generator portion 206 (as shown in FIG. 2) may be communicated to cards played portion 204 (as shown in FIG. 2) such that the cards are not selected on subsequent card generation operations.

Referring back to FIG. 3, then in a step 312 playing card information is presented.

As a non-limiting example, hole card information associated with player cards portion 222 (as shown in FIG. 2) and community card information associated with community cards portion 216 (as shown in FIG. 2) is presented via player GUI portion 214 (as shown in FIG. 2).

Referring back to FIG. 3, then in a step 314, a determination is performed for exchanging a hole card.

As a non-limiting example, player is presented with exchange indicator 126 (as shown in FIG. 1A). Furthermore, information associated with fee for performing exchange is retrieved from hole card exchange fee portion 210 (as shown in FIG. 2).

Referring back to FIG. 3, for a determination of exchanging a hole card in step 314, then in a step 316, player is prompted to continue or cancel exchange.

As a non-limiting example, user may be presented with discard selection 130 (as shown in FIG. 1B) and cancel selection 132 (as shown in FIG. 1B).

Referring back to FIG. 3, for a determination of selecting to perform the exchange, then in a step 318, the exchange is performed.

As a non-limiting example, new card is retrieved from random card generator portion 206 (as shown in FIG. 2). Furthermore, new card replaces old hole card associated with player cards portion 222 (as shown in FIG. 2). Information associated with the fee for performing the exchange is retrieved from hole card exchange fee portion 210 (as shown in FIG. 2), but information associated with player bank portion 212 (as shown in FIG. 2) and pot portion 226 (as shown in FIG. 2) are not changed to reflect an exchange fee, as bank accounts and pot are updated after rounds associated with game have been executed.

Referring back to FIG. 3, then in a step 320 new card is presented to player.

As a non-limiting example, new card retrieved for hole card is presented to the respective player via player GUI portion 214 (as shown in FIG. 2) and as shown in FIG. 1C., however, other players are not presented with new hole card information.

Referring back to FIG. 3, for a determination of not exchanging a hole card in step 314 and for selecting to cancel the exchange in step 316, then in a step 322 player performs selections.

As a non-limiting example, player may perform selections associated with playing the game such as check selection 114 (as shown in FIGS. 1A-C), call selection 116 (as shown in FIGS. 1A-C), fold selection 118 (as shown in FIGS. 1A-C) and check-fold selection 120 (as shown in FIGS. 1A-C) and as received by player select portion 218 (as shown in FIG. 2). Furthermore, information associated with player bet portion 228 (as shown in FIG. 2) may be updated based upon selections. In some embodiments, player may select which community cards to be used via player select portion 218 (as shown in FIG. 2) and card select portion 220 (as shown in FIG. 2).

Referring back to FIG. 3, then in a step 324, information associated with game is updated.

As a non-limiting example, round information associated with round track portion 208 (as shown in FIG. 2) may be updated.

Referring back to FIG. 3, then in a step 326, a determination is performed for the last round.

As a non-limiting example, round information is retrieved from round track portion 208 and processed to determine if the last round has been performed.

Referring back to FIG. 3, for a determination of not performing the last round in step 326, execution of method 300 transitions to step 308.

Referring back to FIG. 3, for a determination of performing the last round, then in a step 328 a determination for a winner is performed.

As a non-limiting example, winner select portion 224 (as shown in FIG. 2) receives card information from player cards portion 222 (as shown in FIG. 2) and card select portion 220 (as shown in FIG. 2) and determines which player has the best hand.

Referring back to FIG. 3, then in a step 330 information associated with the winner is presented.

As a non-limiting example, information associated with winner and losers is presented via player GUI portion 214 (as shown in FIG. 2). Furthermore, information associated with player bank portion 212 (as shown in FIG. 2) is updated, including exchange fees performed during the game.

Referring back to FIG. 3, then in a step 332 execution of method 300 terminates.

FIG. 3 illustrates an example method for operation of the system as described with reference to FIGS. 1-2 where the system is initialized, players access the system, round information is retrieved, card information is retrieved, card information is presented, exchanging a hold card may be selected, canceling an exchange of a hold card may be selected, hole card may be exchanged, hole card may be presented, player may perform selections, information is updated, a determination for a last round may be performed, a winner may be determined and information associated with a winner may be presented.

Systems have been described with provides means and methods for providing an online game. Furthermore, the game accommodates a multiplicity of players. Furthermore, the game provides players with the capability for exchanging a hole card for a new card without other players being made aware of the occurrence of the exchange. Furthermore, information associated with fees for performing the exchange(s) is/are presented at the end of the game such that the occurrence of the exchange(s) remains anonymous to the other players. Selection of a hole card for exchange enables illumination of the card such that a player remains aware of the hole card chosen for exchange. Discard and cancel selections are provided for continuing an exchange or terminating an exchange. Discard and cancel selections may be illuminated or highlighted prior to selection when hovered over with a cursor.

In some embodiments, a flat fee may be used for card exchange instead of a sliding fee structure. In some embodiments, players may exchange either hold card multiple times during the game. In some embodiments, the blocking features for presenting information associated with an exchange may not be incorporated, however, performance of the card exchange is maintained. In some embodiments players would only be allowed to make an exchange during a previously selected betting round(s). In some embodiments, the appropriate discard fee may be presented to a player for viewing during the entire exchange process. In some embodiments, the discard fee structure may be presented to all players for constant viewing on the poker table during the game. In some embodiments, a player may play a multiplicity of poker games at the same time. In some embodiments, the game may be played with play money. In some embodiments, the game may be played with real currency. In some embodiments, discard of a hole card may be selected via alternative selection methods. In some embodiments, the number of community cards may be increased or decreased. In some embodiments, the number of hole cards may be increased or decreased. In some embodiments, the game may be played on a standard poker table, however, execution of exchange fees may not be anonymous. In some embodiments a player having made an exchange may be allowed to exchange the new card for his original hole card. In some embodiments the hidden or blocked card exchange could be incorporated in other poker games such as draw or stud poker or three or four card poker or other forms of poker. In some embodiments a player could be pitted against brick and mortar dealers or conceivably online house dealers who also have the option to exchange. In some embodiments an online poker room company could provide real online play to multiple brick and mortar establishments who in turn could provide interactive terminals to their customers. In some embodiments interactive online and/or brick and mortar players could be provided with bonus or progressive type games.

In some embodiments, the game may be played via players located at casinos, card rooms and other “brick and mortar” establishments. In some embodiments, the blocked or hidden exchange mechanism may be incorporated into games associated with “brick and mortar” establishments. In some embodiments the blocked or hidden exchange mechanism could be incorporated into poker tables associated with high stake brick and mortar poker tournaments such as the WPT, “World Poker Tour” and the WSP, “World Series of Poker”.

In some embodiments, the game may be performed via custom hand-held computing devices.

In some embodiments, a card exchange may be performed via a double click selection mechanism. In some embodiments, card exchange may be performed via a single click with a fade in/fade out presentation mechanism or a highlighting or illumination feature.

“Texas Twist’em” provides for a exciting poker game with high entertainment value which aids in player retention and attracting new players, as players remain in the game longer due to improvement of their hands and as a result play more rounds. Furthermore, the addition of card exchange fees to the pot at the end of the game increases player winnings and revenue associated with playing the game. Furthermore, the addition of the capability for exchanging a hole card for a new card does not significantly slow play of the game.

In an alternative embodiment of the present invention, the game does not permit three separate rounds of buy-backs wherein players are allowed to discard any card from a hand for a new card dealt from the deck, after paying progressively higher exchange fees.

In another alternative embodiment of the present invention, the game does not allow a multi-handed poker game where cards are arranged as a polygon, where sides have the same number of cards and the sides have corner cards that are shared with adjacent hands such that players may exchange cards from one hand with cards in another hand in order to improve odds for winning.

Figure 4:
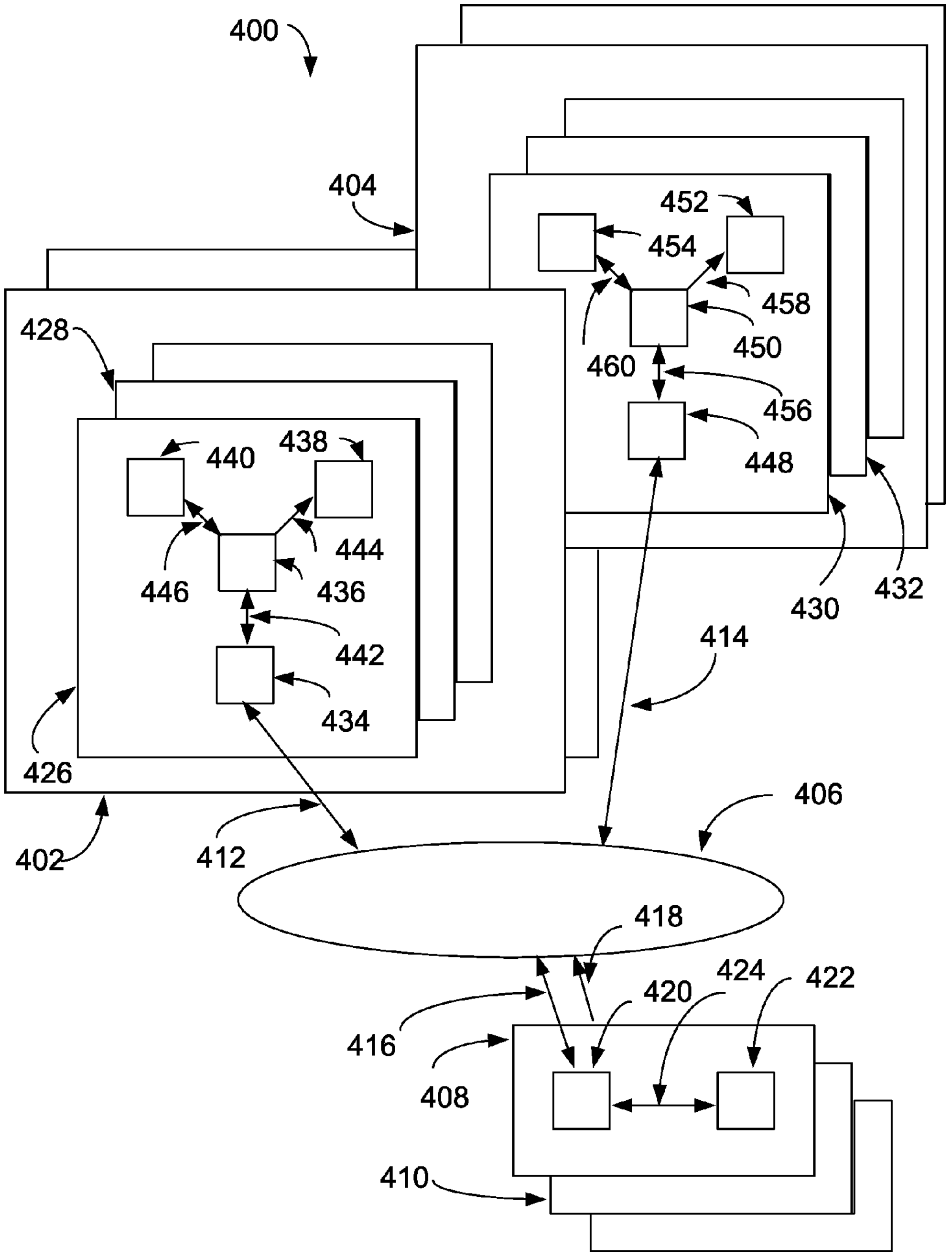
FIG. 4 illustrates a block diagram depicting a conventional client/server communication system.

In another alternative embodiment of the present invention, the game does not allow for a player to play their own hand and a “party hand”, such that improving a hand, and wagering associated with a hand, provides for exchanging of cards from one hand with the party hand such that the party hand is improved based upon standard poker ranking system FIG. 4 illustrates a block diagram depicting a conventional client/server communication system.

A communication system 400 includes a multiplicity of networked regions with a sampling of regions denoted as a network region 402 and a network region 404, a global network 406 and a multiplicity of servers with a sampling of servers denoted as a server device 408 and a server device 410.

Network region 402 and network region 404 may operate to represent a network contained within a geographical area or region. Non-limiting examples of representations for the geographical areas for the networked regions may include postal zip codes, telephone area codes, states, counties, cities and countries. Elements within network region 402 and 404 may operate to communicate with external elements within other networked regions or within elements contained within the same network region.

In some implementations, global network 406 may operate as the Internet. It will be understood by those skilled in the art that communication system 400 may take many different forms. Non-limiting examples of forms for communication system 400 include local area networks (LANs), wide area networks (WANs), wired telephone networks, cellular telephone networks or any other network supporting data communication between respective entities via hardwired or wireless communication networks. Global network 406 may operate to transfer information between the various networked elements.

Server device 408 and server device 410 may operate to execute software instructions, store information, support database operations and communicate with other networked elements. Non-limiting examples of software and scripting languages which may be executed on server device 408 and server device 410 include C, C++, C# and Java.

Network region 402 may operate to communicate bi-directionally with global network 406 via a communication channel 412. Network region 404 may operate to communicate bi-directionally with global network 406 via a communication channel 414. Server device 408 may operate to communicate bi-directionally with global network 406 via a communication channel 416. Server device 410 may operate to communicate bi-directionally with global network 406 via a communication channel 418. Network region 402 and 404, global network 406 and server devices 408 and 410 may operate to communicate bi-directionally and also communicate bi-directionally with other networked device located within communication system 400.

Server device 408 includes a networking device 420 and a server 422. Networking device 420 may operate to communicate bi-directionally with global network 406 via communication channel 416 and with server 422 via a communication channel 424. Server 422 may operate to execute software instructions and store information.

Network region 402 includes a multiplicity of clients with a sampling denoted as a client 426 and a client 428. Client 426 includes a networking device 434, a processor 436, a GUI 438 and an interface device 440. Non-limiting examples of devices for GUI 438 include monitors, televisions, cellular telephones, smartphones and PDAs (Personal Digital Assistants). Non-limiting examples of interface device 440 include pointing device, mouse, trackball, scanner and printer. Networking device 434 may communicate bi-directionally with global network 406 via communication channel 412 and with processor 436 via a communication channel 442. GUI 438 may receive information from processor 436 via a communication channel 444 for presentation to a user for viewing. Interface device 440 may operate to send control information to processor 436 and to receive information from processor 436 via a communication channel 446. Network region 404 includes a multiplicity of clients with a sampling denoted as a client 430 and a client 432. Client 430 includes a networking device 448, a processor 450, a GUI 452 and an interface device 454. Non-limiting examples of devices for GUI 438 include monitors, televisions, cellular telephones, smartphones and PDAs (Personal Digital Assistants). Non-limiting examples of interface device 440 include pointing devices, mousse, trackballs, scanners and printers. Networking device 448 may communicate bi-directionally with global network 406 via communication channel 414 and with processor 450 via a communication channel 456. GUI 452 may receive information from processor 450 via a communication channel 458 for presentation to a user for viewing. Interface device 454 may operate to send control information to processor 450 and to receive information from processor 450 via a communication channel 460.

For example, consider the case where a user interfacing with client 426 may want to execute a networked application. A user may enter the IP (Internet Protocol) address for the networked application using interface device 440. The IP address information may be communicated to processor 436 via communication channel 446. Processor 436 may then communicate the IP address information to networking device 434 via communication channel 442. Networking device 434 may then communicate the IP address information to global network 406 via communication channel 412. Global network 406 may then communicate the IP address information to networking device 420 of server device 408 via communication channel 416. Networking device 420 may then communicate the IP address information to server 422 via communication channel 424. Server 422 may receive the IP address information and after processing the IP address information may communicate return information to networking device 420 via communication channel 424. Networking device 420 may communicate the return information to global network 406 via communication channel 416. Global network 406 may communicate the return information to networking device 434 via communication channel 412. Networking device 434 may communicate the return information to processor 436 via communication channel 442. Processor 436 may communicate the return information to GUI 438 via communication channel 444. User may then view the return information on GUI 438.

Figure 5:
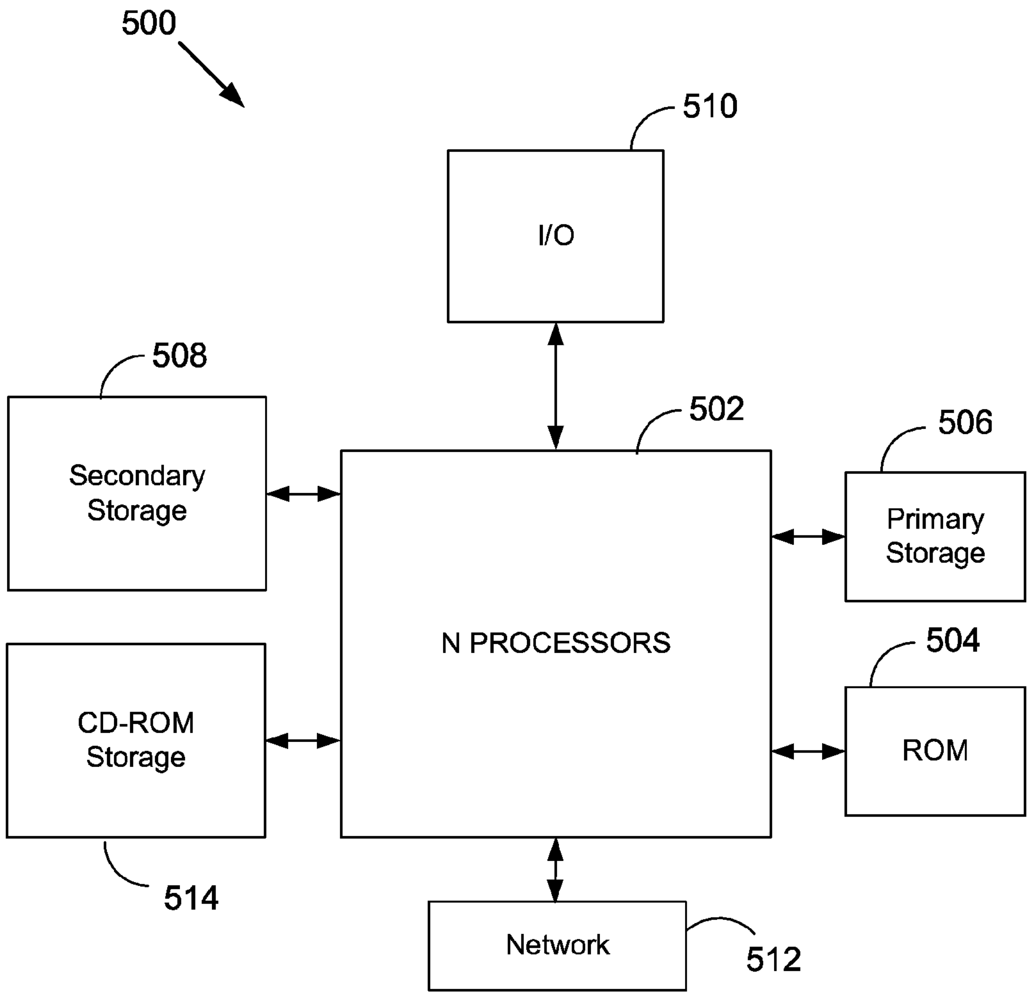
FIG. 5 illustrates a typical computer system that, when appropriately configured or designed, may serve as a computer system 500 for which the present invention may be embodied.

FIG. 5 illustrates a typical computer system that, when appropriately configured or designed, may serve as a computer system 500 for which the present invention may be embodied.

Computer system 500 includes a quantity of processors 502 (also referred to as central processing units, or CPUs) that may be coupled to storage devices including a primary storage 506 (typically a random access memory, or RAM), a primary storage 504 (typically a read-only memory, or ROM). CPU 502 may be of various types including microcontrollers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors. As is well known in the art, primary storage 504 acts to transfer data and instructions uni-directionally to the CPU and primary storage 506 typically may be used to transfer data and instructions in a bi-directional manner. The primary storage devices discussed previously may include any suitable computer-readable media such as those described above. A mass storage device 508 may also be coupled bi-directionally to CPU 502 and provides additional data storage capacity and may include any of the computer-readable media described above. Mass storage device 508 may be used to store programs, data and the like and typically may be used as a secondary storage medium such as a hard disk. It will be appreciated that the information retained within mass storage device 508, may, in appropriate cases, be incorporated in standard fashion as part of primary storage 506 as virtual memory. A specific mass storage device such as a CD-ROM 514 may also pass data uni-directionally to the CPU.

CPU 502 may also be coupled to an interface 510 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to an external device such as a database or a computer or telecommunications or internet network using an external connection shown generally as a network 512, which may be implemented as a hardwired or wireless communications link using suitable conventional technologies. With such a connection, the CPU might receive information from the network, or might output information to the network in the course of performing the method steps described in the teachings of the present invention.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation: global communication network and servers.

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breath life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of an online gaming system according to the present invention will be apparent to those skilled in the art. The invention has been described above by way of illustration, and the specific embodiments disclosed are not intended to limit the invention to the particular forms disclosed. For example, the particular implementation of the graphical user interface may vary depending upon the particular type computing device used. The computing devices described in the foregoing were directed to laptop computing device implementations; however, similar techniques using smartphone implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A method comprising the steps of:

accessing a server unit being configured to be operable for conducting an on-line card game comprising a plurality of players engaging in wagering on an outcome of said on-line card game, said accessing enabling joining to a plurality of other players in play of an on-line card game;

receiving at least two values for hole cards from said server unit for display with a representation of a gaming table, said values being hidden from said other players at least during rounds of said play;

selecting at least one of said values for exchange, said selecting resulting in a change in illumination of said display of said selected hole card, said change in illumination being hidden from said other players;

requesting said sever unit to exchange said selected one of said values for another randomly generated value during a round of said play, said requesting being hidden from said other players;

receiving from said server unit said randomly generated value in exchange for said selected value, said randomly generated value being hidden from said other players at least during rounds of said play; and receiving results from said server unit of said outcome of said on-line card game.

2. The method as recited in claim 1, in which said requesting initiates a debiting of a fee by said server unit, said debiting being hidden from said other players.

3. The method as recited in claim 2, in which said fee is displayed on said gaming table prior to said requesting, said display of said fee being hidden from said other players.

4. The method as recited in claim 2, in which said fee is credited to a winning pot at completion of said play.

5. The method as recited in claim 1, in which said requesting is at least allowed once during said play.

6. The method as recited in claim 1, further comprising the step of confirming said selection by further selecting a displayed icon, on said gaming table, indicating discard, said display of said icon changing illumination prior to being selected, said display of said icon being hidden from said other players.

7. The method as recited in claim 1, in which said on-line card game further comprises a poker game.

8. The method as recited in claim 7, in which said poker game is a Texas Twist'em.

9. A system comprising:

a server unit being configured to be operable for conducting an on-line card game comprising a plurality of players engaging in wagering on an outcome of said on-line card game; and a client application being configured to be operable for accessing said server unit for enabling a player to join a plurality of other players in play of an on-line card game, said client application being further configured to be operable for receiving at least two values for hole cards from said server unit for display with a representation of a gaming table, said values being hidden from said other players at least during rounds of said play, said client application being further configured to be operable for selecting at least one of said values for exchange, said selecting resulting in a change in illumination of said display of said selected hole card, said change in illumination being hidden from said other players and for requesting said sever unit to exchange said selected one of said values for another randomly generated value during a round of said play, said requesting being hidden from said other players, said client application being further configured to be operable for receiving from said server unit said randomly generated value in exchange for said selected value, said randomly generated value being hidden from said other players at least during rounds of said play, said client application being further configured to be operable for receiving results from said server unit of said outcome of said on-line card game.

10. The system as recited in claim 9, in which said on-line card game further comprises a Texas Twist'em version of a poker game, said client application is further configured to be operable for confirming said selection by further selecting a displayed icon, on said gaming table, indicating discard, said display of said icon changing illumination prior to being selected, said display of said icon being hidden from said other players, said requesting is at least allowed once during said play.

11. A non-transitory computer-readable storage medium with an executable program stored thereon, wherein the program instructs a processor to perform the following steps:

accessing a server unit being configured to be operable for conducting an on-line card game comprising a plurality of players engaging in wagering on an outcome of said on-line card game, said accessing enabling joining to a plurality of other players in play of an on-line card game;

receiving at least two values for hole cards from said server unit for display with a representation of a gaming table, said values being hidden from said other players at least during rounds of said play;

selecting at least one of said values for exchange, said selecting resulting in a change in illumination of said display of said selected hole card, said change in illumination being hidden from said other players;

requesting said sever unit to exchange said selected one of said values for another randomly generated value during a round of said play, said requesting being hidden from said other players;

receiving from said server unit said randomly generated value in exchange for said selected value, said randomly generated value being hidden from said other players at least during rounds of said play; and receiving results from said server unit of said outcome of said on-line card game.

12. The program instructing the processor as recited in claim 11, in which said requesting initiates a debiting of a fee by said server unit, said debiting being hidden from said other players.

13. The program instructing the processor as recited in claim 12, in which said fee is displayed on said gaming table prior to said requesting, said display of said fee being hidden from said other players.

14. The program instructing the processor as recited in claim 12, in which said fee is credited to a winning pot at completion of said play.

15. The program instructing the processor as recited in claim 11, in which said requesting is at least allowed once during said play.

16. The program instructing the processor as recited in claim 11, further comprising the step of confirming said selection by further selecting a displayed icon, on said gaming table, indicating discard, said display of said icon changing illumination prior to being selected, said display of said icon being hidden from said other players.

17. The program instructing the processor as recited in claim 16, in which said poker game is a Texas Twist'em.

18. The program instructing the processor as recited in claim 11, in which said on-line card game further comprises a poker game.

* * * * *